United States Patent
Sapello et al.

(10) Patent No.: US 9,654,499 B2
(45) Date of Patent: May 16, 2017

(54) SYSTEM AND METHOD FOR MITIGATING TOC/TOU ATTACKS IN A CLOUD COMPUTING ENVIROMENT

(71) Applicants: Vencore Labs, Inc., Basking Ridge, NJ (US); KDDI Corporation, Tokyo (JP)

(72) Inventors: Angelo Sapello, Basking Ridge, NJ (US); Abhrajit Ghosh, Basking Ridge, NJ (US); Alexander Poylisher, Basking Ridge, NJ (US); C. Jason Chiang, Basking Ridge, NJ (US); Ayumu Kubota, Tokyo (JP); Takashi Matsunaka, Tokyo (JP)

(73) Assignee: Vencore Labs, Inc., Basking Ridge, NJ (US)

( * ) Notice: Subject to any disclaimer, the term of this patent is extended or adjusted under 35 U.S.C. 154(b) by 0 days.

(21) Appl. No.: 14/743,774

(22) Filed: Jun. 18, 2015

(65) Prior Publication Data
US 2015/0373046 A1     Dec. 24, 2015

Related U.S. Application Data

(60) Provisional application No. 62/015,137, filed on Jun. 20, 2014.

(51) Int. Cl.
*G06F 11/00* (2006.01)
*H04L 29/06* (2006.01)
*G06F 21/57* (2013.01)

(52) U.S. Cl.
CPC .......... *H04L 63/145* (2013.01); *G06F 21/575* (2013.01); *G06F 21/577* (2013.01); *H04L 63/1433* (2013.01)

(58) Field of Classification Search
CPC . H04L 63/145; H04L 63/1433; G06F 21/575; G06F 21/577
USPC .......................................................... 726/23
See application file for complete search history.

(56) References Cited

U.S. PATENT DOCUMENTS

| | | | | |
|---|---|---|---|---|
| 7,996,836 B1* | 8/2011 | McCorkendale | ....... | G06F 21/53 713/164 |
| 8,627,414 B1* | 1/2014 | McCune | ............... | H04L 9/3234 709/212 |
| 9,177,153 B1* | 11/2015 | Perrig | ................... | G06F 21/577 |
| 2007/0088957 A1* | 4/2007 | Carson | ................... | G06F 21/64 713/176 |

(Continued)

OTHER PUBLICATIONS

Seshadri et al., SWATT: Software Based ATTestation for Embedded Devices, Proceedings of IEEE Symposium on Security and Privacy, 2004.*

(Continued)

*Primary Examiner* — Teshome Hailu
(74) *Attorney, Agent, or Firm* — Heslin Rothneberg Farley & Mesiti P.C.

(57) ABSTRACT

A computer system, method, and computer program product for mitigating TOCTOU attacks, which includes: as processor requesting measurements representing operation of a first process on a host that is untrusted and based on the requesting, obtaining the measurements, which include a checksum that is a result of a second process executing checksum code to verify at least one last branch record on the host. A processor also determined, based on the measurements, whether the first process was compromised.

20 Claims, 11 Drawing Sheets

Tusted Platform 140

Untusted Platform 160

(56) References Cited

U.S. PATENT DOCUMENTS

| | | | |
|---|---|---|---|
| 2010/0117873 A1* | 5/2010 | Aciicmez | H03M 7/3086 341/51 |
| 2012/0291094 A9* | 11/2012 | Forrester | H04L 63/12 726/3 |
| 2013/0024676 A1* | 1/2013 | Glew | G06F 21/554 712/244 |
| 2013/0036314 A1* | 2/2013 | Glew | G06F 12/1408 713/194 |

OTHER PUBLICATIONS

Pappas et al., Transparent ROP Exploit Mitigation Using Indirect Branch Tracing, proceedings of 22nd USENIX Security Symposium, Aug. 14-16, 2013, washington, DC.*

CFIMon: Detecting Violation of Control Flow Integrity using Performance Counters, Xia et al., 42nd Annual IEEE/IFIP International Conference on Dependable Systems and Networks, 2012.*

* cited by examiner

SYSTEM AND METHOD FOR MITIGATING TOC/TOU ATTACKS IN A CLOUD COMPUTING ENVIROMENT

CROSS REFERENCE TO RELATED APPLICATION

The present invention claims priority from U.S. provisional patent application No. 62/015,137, filed Jun. 20, 2014, which is hereby incorporated herein by reference in its entirety.

FIELD OF INVENTION

The Invention relates generally to systems and methods for mitigating Time of Check Time of Use (TOCTOU) attacks that attempt to intercept the integrity verification process and hide evidence of software tampering.

BACKGROUND OF INVENTION

Time of Check, Time of Use (TOCTOU) is a technique that malware may use to evade detection. TOCTOU is effective if malware has the ability to detect the start of an integrity check. Before the integrity check function starts, the malware first completely removes all its traces from memory before releasing the CPU, such that the ensuing execution of the integrity check function will not detect any anomaly.

The cloud paradigm continues to gain popularity as a low cost means to provide computing infrastructure and services. While the cost savings are attractive, the ability to trust the integrity of services delivered over cloud platforms remains an issue. The Trusted Computing Group (TCG) defines standards for secure computing platforms. These standards are based on a hardware chip called a Trusted Platform Module (TPM) being present on the platform. A TPM is typically used to collect load time software integrity measurements. These measurements are performed using primitives such as hash functions (e.g. SHA-1, or another secure hash algorithm,). A cloud service user can compare these measurements with previously computed values to determine whether or not the software loaded on the cloud platform has been tampered with.

Hardware TPM approaches suffer from some shortcomings: (i) they require a trusted third party (TPM vendor) in a trusted supply chain; (ii) vulnerable measurement primitives can only be corrected by a hardware upgrade; (iii) run-time integrity verification is not performed; and (iv) TPM may not be available on all platforms.

SUMMARY OF INVENTION

Shortcomings of the prior art are also overcome and additional advantages are provided through the provision of a method mitigating TOCTOU attacks, the method includes: requesting, by a processor, measurements representing operation of a first process on a host, wherein the host is untrusted; based on the requesting, obtaining, by the processor, the measurements, wherein the measurements comprise a checksum that is a result of a second process executing checksum code to verify at least one last branch record on the host; and determining, by the processor, based on the measurements, whether the first process was compromised.

Computer systems, computer program products, and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings.

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. The terms software and program code are used interchangeably throughout this application.

The process of a client querying for integrity measurements, collected using either hardware (e.g. TPM) or software (e.g. timing based), is referred to by those of skill in the art as attestation. The client is referred to as a verifier while the platform being queried is referred to as an attestation platform.

Aspects of the present invention include utilizing timing-based attestation to provide software attestation for cloud computing services.

Aspects of the present invention address the problem of verifying the integrity of software executing on a given platform without dependence on hardware trust mechanisms such as Trusted Processing Modules (TPMs).

Aspects of the present invention address the detection of Time of Check Time of Use (TOCTOU) attacks that attempt to intercept the integrity verification process and hide evidence of software tampering.

Aspects of the present invention utilize Last Branch Records (LBRs) in the context of software attestation and TOCTOU attacks. Although LBRs have been considered for addressing control flow violation attacks, they have not been utilized to address TOCTOU attacks on software attestation systems.

Figure 1:
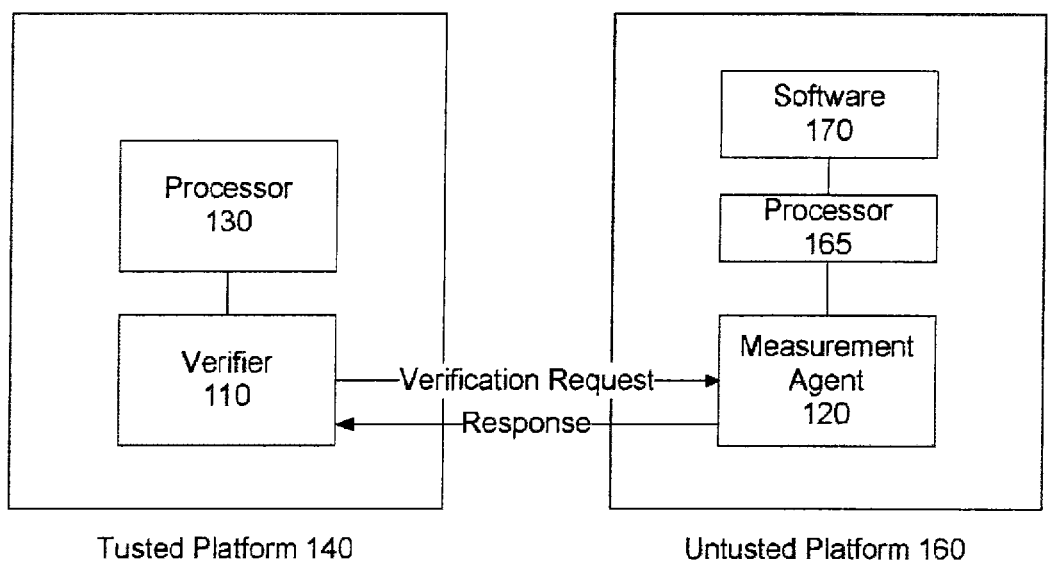
FIG. 1 depicts aspects of an embodiment of the present invention.

For ease of understanding, an embodiment of the present invention can be understood as including two software components (also referred to as routines, processes, applications, modules). One of skill in the art will recognize that these software components can be embodied in a single computer program product, and/or module, and/or can include program code that resides on the same computer readable medium, and/or can be separated into any number of physical manifestations. FIG. 1 is a depiction of the interaction between program code executing on processors in a computer system that perform aspects of the disclosed method.

Referring to FIG. 1, when understood as two software components, in an embodiment of the present invention, the components include a Verifier 110 component and a Measurement Agent 120. In this embodiment, the Verifier 110 component is executed at least one processor 130 on a trusted platform 140. The Verifier 110 executed by at least one processor 130 on the trusted platform 140 is responsible for issuing integrity verification requests to the Measurement Agent 120, which is executed by at least one processor 150 on an untrusted platform 160.

The Measurement Agent 120 responds to each verification request by the Verifier 110 by conducting integrity measurements of software 170 executed by at least one processor 165, on the untrusted platform 160 and sending the measurements back to the Verifier 110. As understood by one of skill in the art, processor 130 and processor 165 may be physically located on platforms or many be accessible to those platforms, but located elsewhere.

The integrity measurements include data that determine (a) whether the verification request was intercepted before measurements were conducted and/or (b) whether the Measurement Agent 120 was tampered (i.e., compromised) with on the untrusted platform 160. Based on receiving the measurements, the Verifier 110 determines, in addition to (a) and (b), whether the software on the untrusted platform 160 was tampered with.

Figure 2A:
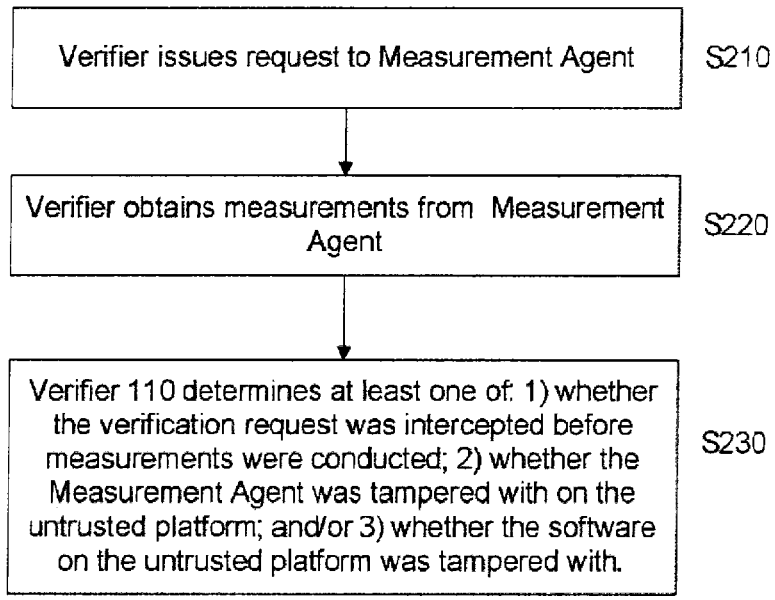
FIGS. 2A-2B depict workflows associated with aspects of embodiments of the present invention.
Figure 2B:
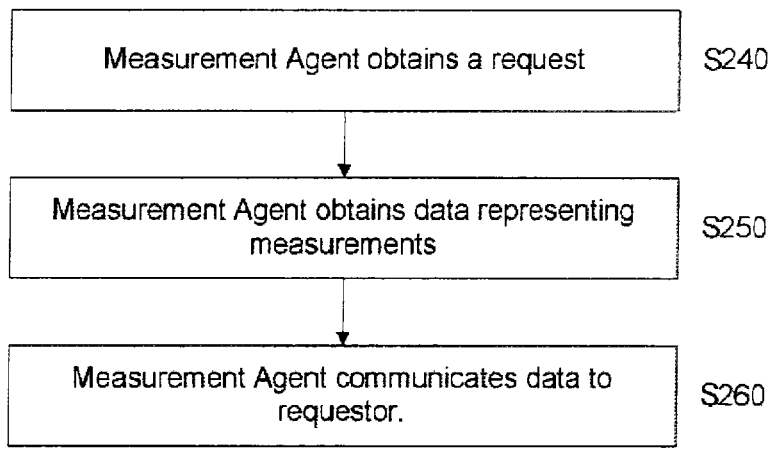

FIG. 2A is a workflow of the method disclosed during the discussion of FIG. 1 from the perspective of the Verifier 110, while FIG. 2B is a workflow of this method from the perspective of the Measurement Agent 120. For ease of understanding, FIGS. 2A-2B make reference to the elements of FIG. 1 utilizing the same numbers.

Referring first to FIG. 2A, in an embodiment of the present invention, the Verifier 110, executed by at least one processor 130 on the trusted platform 140, issues a requests to the Measurement Agent 120 (S210). The Verifier 110 obtains measurements from the Measurement Agent 120 (S220). Based on the measurements, the Verifier 110 determines at least one of: 1) whether the verification request was intercepted before measurements were conducted; 2) whether the Measurement Agent 120 was tampered with on the untrusted platform 160; and/or 3) whether the software on the untrusted platform 160 was tampered with (S230).

Referring to FIG. 2B, the Measurement Agent 120 obtains a request (S240). Responsive to this request, the Measurement Agent 120 obtains data representing various measurements (S250). The Measurement Agent 120 communicates the data to the requestor (S260).

Figure 8:
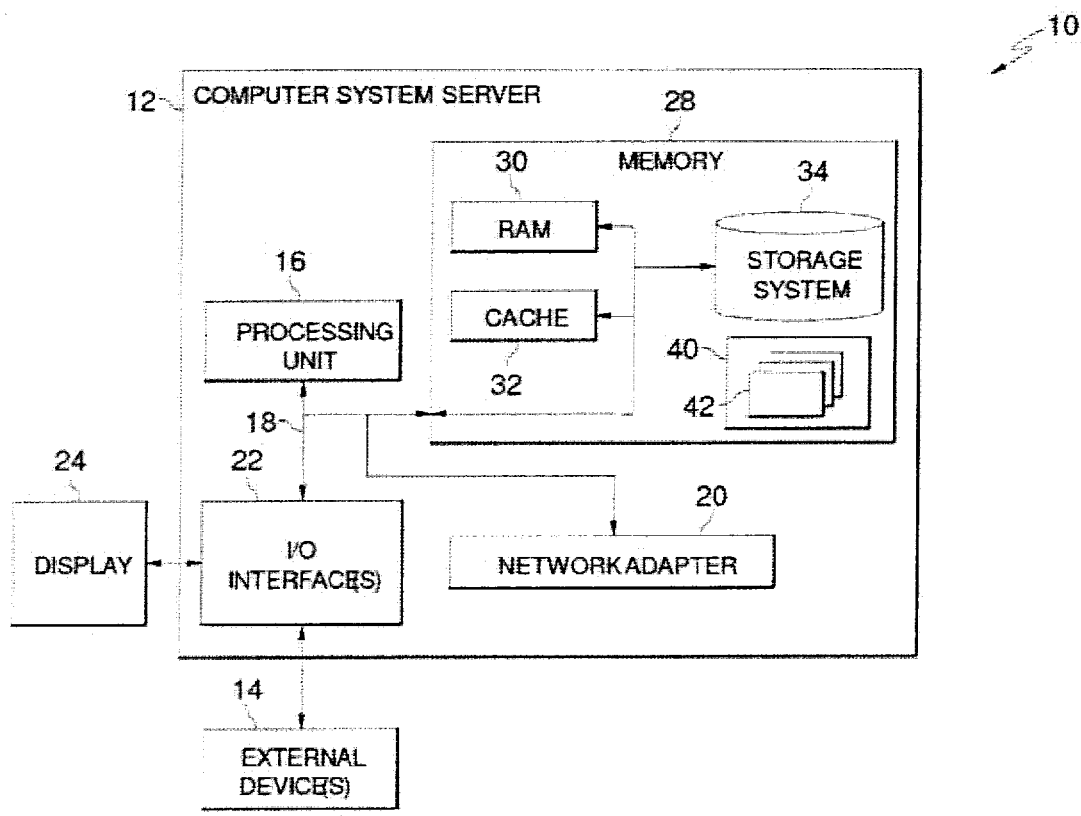
FIG. 8 depicts a cloud computing node according to an embodiment of the present invention.
Figure 9:
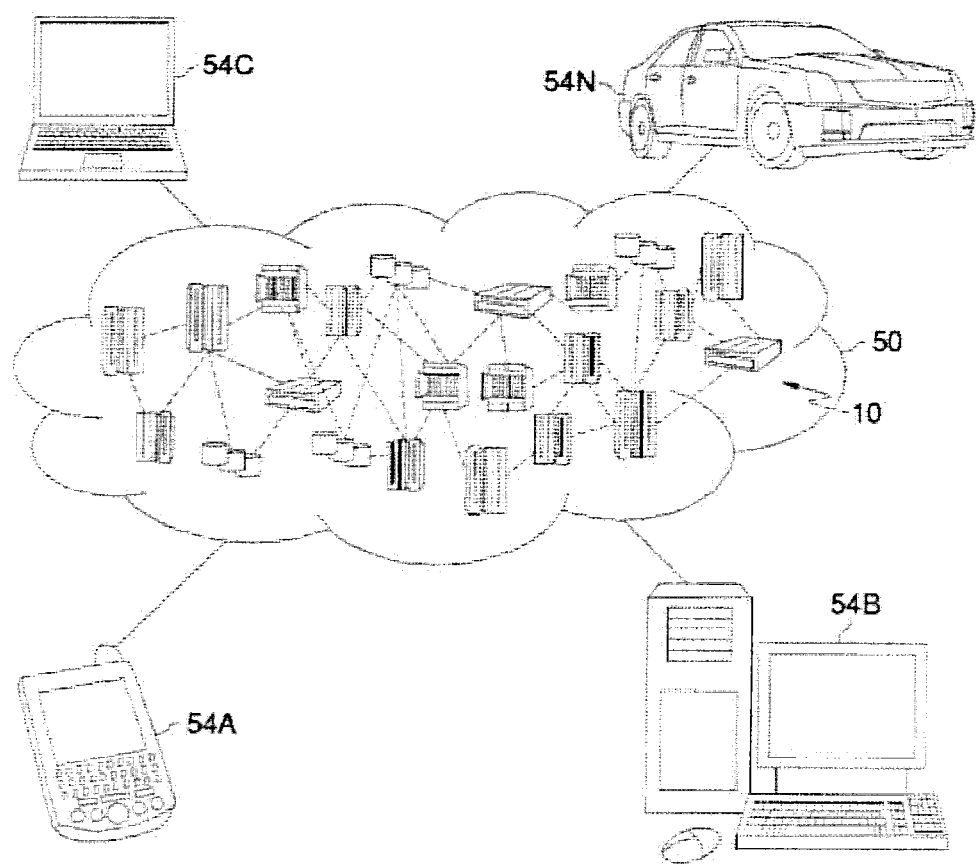
FIG. 9 depicts a cloud computing environment according to an embodiment of the present invention.
Figure 10:
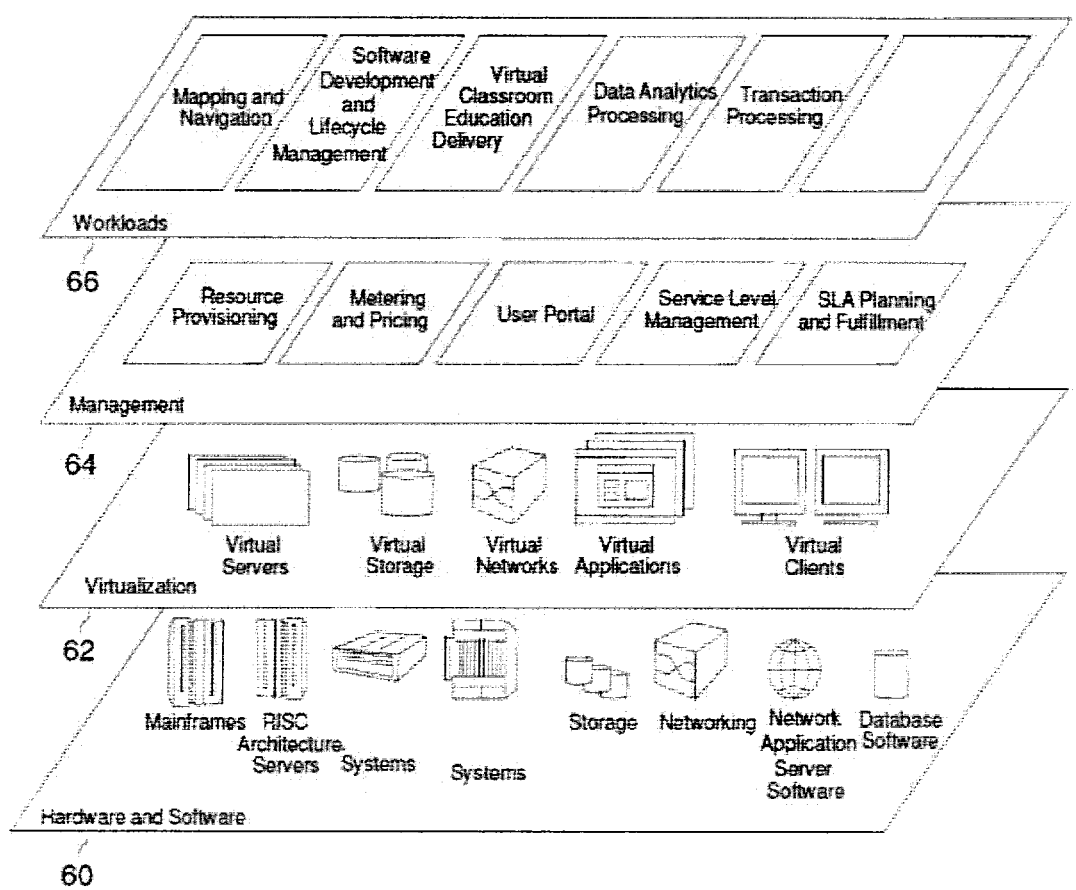
FIG. 10 depicts abstraction model layers according to an embodiment of the present invention.

Embodiments of the present technique address a threat model where an attacker has network access to at least one virtual machine that is part of the cloud computing environment, also referred to as the "cloud machine." The cloud environment itself is discussed in greater detail in FIGS. 8-10. Using network access the attacker can compromise guest operating systems. Using a compromised operating system, the attacker can perform exploits (e.g., VM escape) to modify the hypervisor running on the virtual machine and run arbitrary code on the cloud machine. Even in cases where an attack is not able to tamper with the hardware running the cloud machine, for example, a CPU, the attacker can still create issues by tampering with the software executed by the cloud machine.

The use of hypervisors and virtualization is not limited to a cloud-based environment. As understood by one of skill in the art, virtualization is becoming more and more important in IT systems, as it allows the use of central servers for performing different tasks as required by a user. This includes, that different operating systems can run on a single hardware environment, which offers high flexibility for the user. A virtual machine manager, also called hypervisor, is running on the hardware environment and provides an environment for execution of virtual machines, which are also called guests, for executing the each one operating system. The guests are virtual instances of operating systems, which are encapsulated inside the virtual machine manager and can be executed like running directly on the hardware environment. The hypervisor itself can be running directly on the hardware of a computer, which means without an underlying operating system, or as an application within a standard operating system like a Linux, Windows or others. Also virtual machine managers running on an intermediate instruction layer are known in the art.

Figure 11:
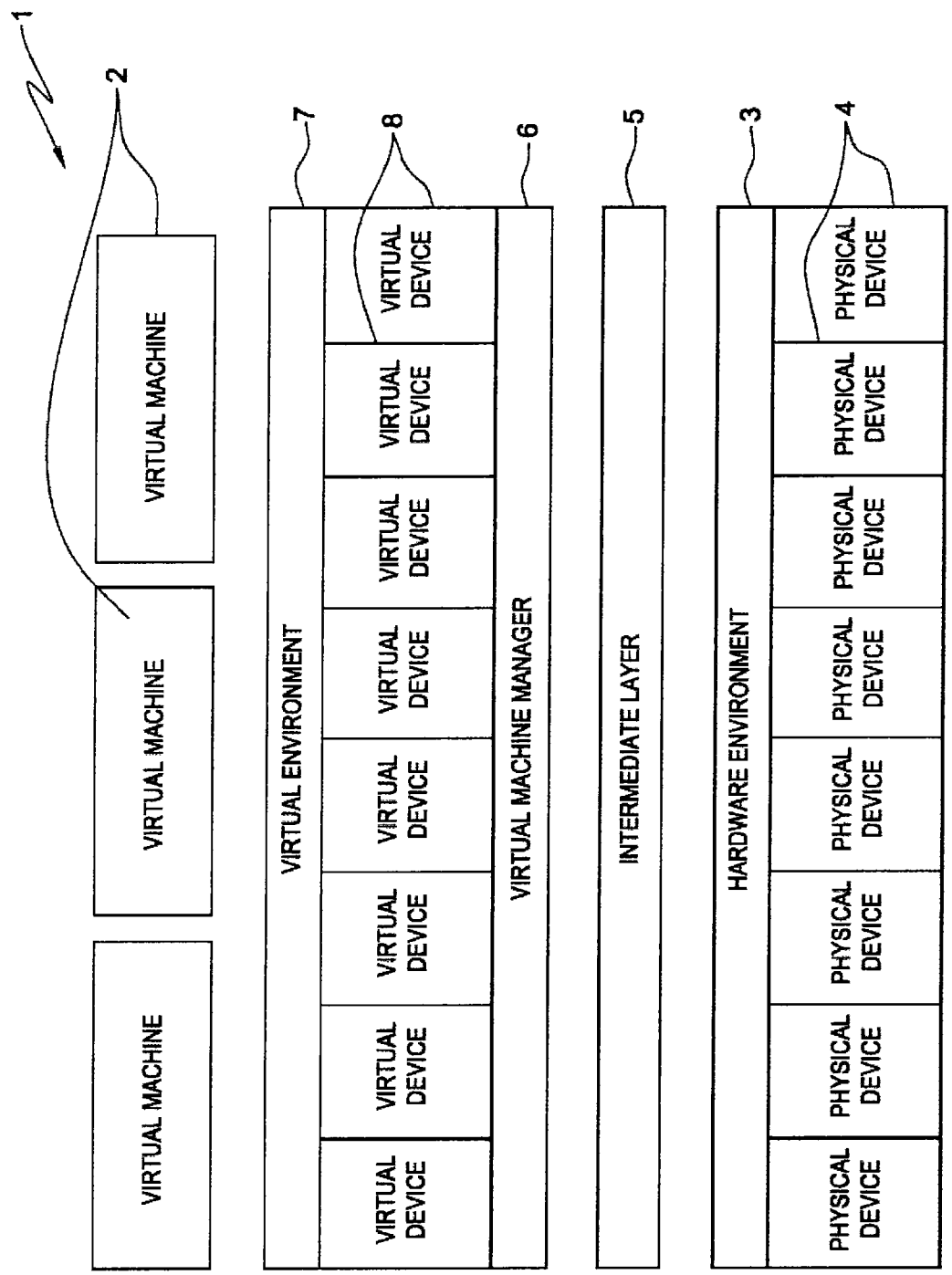
FIG. 11 depicts a virtual environment utilized in an embodiment of the present invention.

FIG. 11 is an example of the technical environment that includes a hypervisor. In FIG. 11, a system 1 running a set of virtual machines 2 can be seen. The system 1 comprises a hardware environment 3, which is formed by a set of physical devices 4. Physical devices can be any kind of devices as known in IT architectures, e.g. storage devices, interfaces, drivers or others. On top of the hardware environment 3 an intermediate layer 5, which is responsible for detecting changes in the current hardware environment 3. This intermediate layer 5 can, e.g., be a BIOS, which provides an abstract interface through a hardware abstraction layer to the physical devices 4.

On top of the intermediate layer 5 is running a virtual machine manager 6, which is also called hypervisor. The hypervisor 6 provides a virtual environment 7. In the example of FIG. 11, the hypervisor 6 provides a virtual environment 7 comprising a set of virtual devices 8. Virtual machines 2 runs on top of the virtual environment 7, and like each individual virtual machine 2 has an operating system.

Aspects of the present technique can be utilized to mitigate Time of Check, Time of Use attacks in a cloud computing environment. However, as will be understood by one of skill in the art, aspects of the present technique are applicable to additional computing environments. In general, integrity checks are a manner in which a machine, whether actual or virtual, can monitor software it is executing and mitigate and potentially thwart attacks. However, TOCTOU is a technique that malware can use to evade detection. TOCTOU is effective if malware has the ability to detect the start of an integrity check. Before the integrity check function starts, the malware completely removes all its traces from memory before releasing the CPU such that the ensuing execution of the integrity check function will not detect any anomaly.

Figure 3:
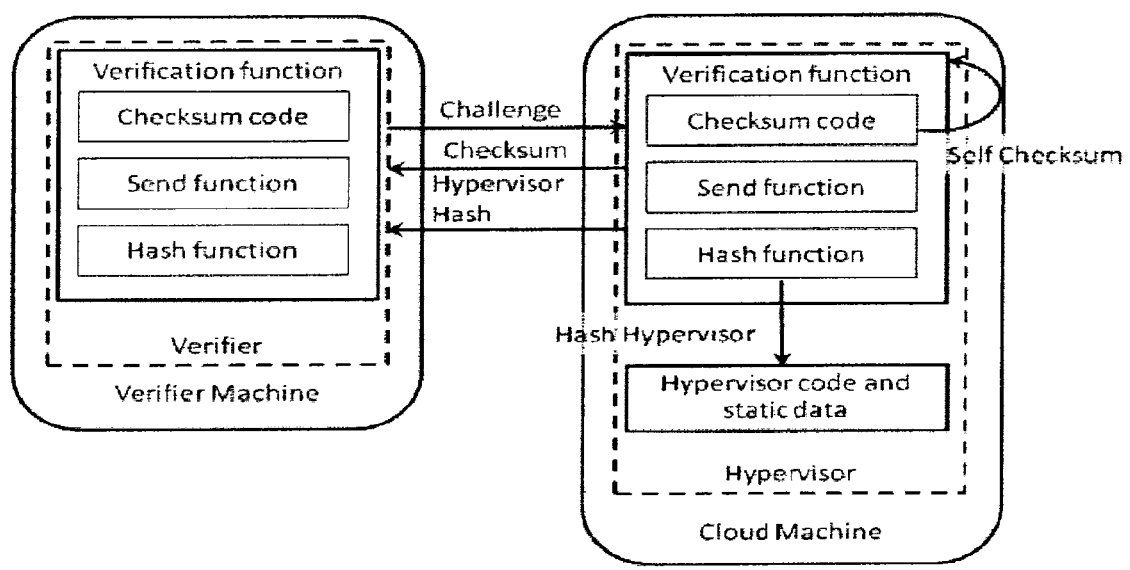
FIG. 3 is an overview of aspects of the present invention.

FIG. 3 provides a high level overview of a verification protocol utilized by an embodiment of the present invention. As seen in FIG. 3, the software that includes the verifier initiates the verification protocol by (i) generating a random number ('Challenge') and sending it to the Measurement Agent on the Attestation Platform. The Measurement Agent (ii) computes a self checksum using the challenge and (iii) sends it to the verifier. The Measurement Agent then (iv) computes a secure hash algorithm (e.g., SHA-1) hash of the hypervisor and (v) sends it back to the verifier.

Embodiments of the present technique utilize a feature common to many technical architectures that is known as a Last Branch Record (LBR). LBRs are a set of Model Specific Registers (MSRs) that are available on processors and are used to track execution control flow. However, in further embodiments of the present invention, aspects of the present technique are portable to other platforms through debug architecture features similar to LBRs. For example, the AMD64 architecture supports LBRs in a more limited fashion then Intel's architectures. ARM has a feature called CoreSite On-Chip debugging that allows tracing of code path.

Embodiments of the present invention utilize LBRs to defend against TOCTOU attacks. In an embodiment of the present invention, an LBR consists of two MSRs, the LBR_FROM_IP and LBR_TO_IP. These registers record the most recent instruction pointer locations that the control flow statements start from and end at, respectively. They are automatically updated by the hardware of a processor in a round-robin manner to record the last N branches made on the processor. Software triggers the update by performing a call, interrupt or jump, but it is the processor that performs the update. Other embodiments of the present invention may utilize firmware and/or microcode to perform these aspects of the present technique. Therefore, no additional time is taken over a system that is not performing these updates. Depending upon the technical environment where mitigation of attacks is attempted, other features of the LBRs may assist in the mitigation. For example, Intel uses additional MSRs to control and maintain the LBRs; the DEBUG_CTL MSR is used to enable and disable the recordings to the LBRs and the LBR_TOS MSR is used to identify the last LBR the processor wrote to.

As is understood by one of skill in the art, execution control flow tracking may be implemented differently under other CPU architectures where there is a means to extract control flow information. The specific approach used by a technical architecture to generate or store control flow data is not relevant to the TOCTOU mitigation technique described herein. To assist in illustrating the described technique, elements of the Intel x86 processor are given as non-limiting examples.

At boot time, LBRs are enabled through a register, for example, DEBUG_CTL MSR, and then protected by an operating system so that they remain enabled when code is executed by the processor. In an example of a technical architecture utilized by an embodiment of the present technique, this protection is provided by a hypervisor on a virtual machine using the secure virtual machine extensions of a processor. Although a privileged attacker could potentially disable LBRs, this activity would result in a bad checksum, revealing the attack to the Verifier 110. As described in further detail below, the LBRs, a debugging feature of the processor, is utilized by the present technique to verify that the code executed by a virtual machine is launched from the correct location and executed in its entirety from beginning to end.

To take advantage of the availability of LBRs, in an aspects of an embodiment of the present technique, software executing on a processor verifies prior to the execution of integrity check code, which may be triggered by a serial port interrupt, that there is no suspicious direct jump to the integrity check code as recorded by the LBR pointed to by the LBR_TOS MSR. Thus, if the value of LBR_FROM_IP of the LBR is unexpected, it is strong evidence of the existence of malware.

Figure 4:
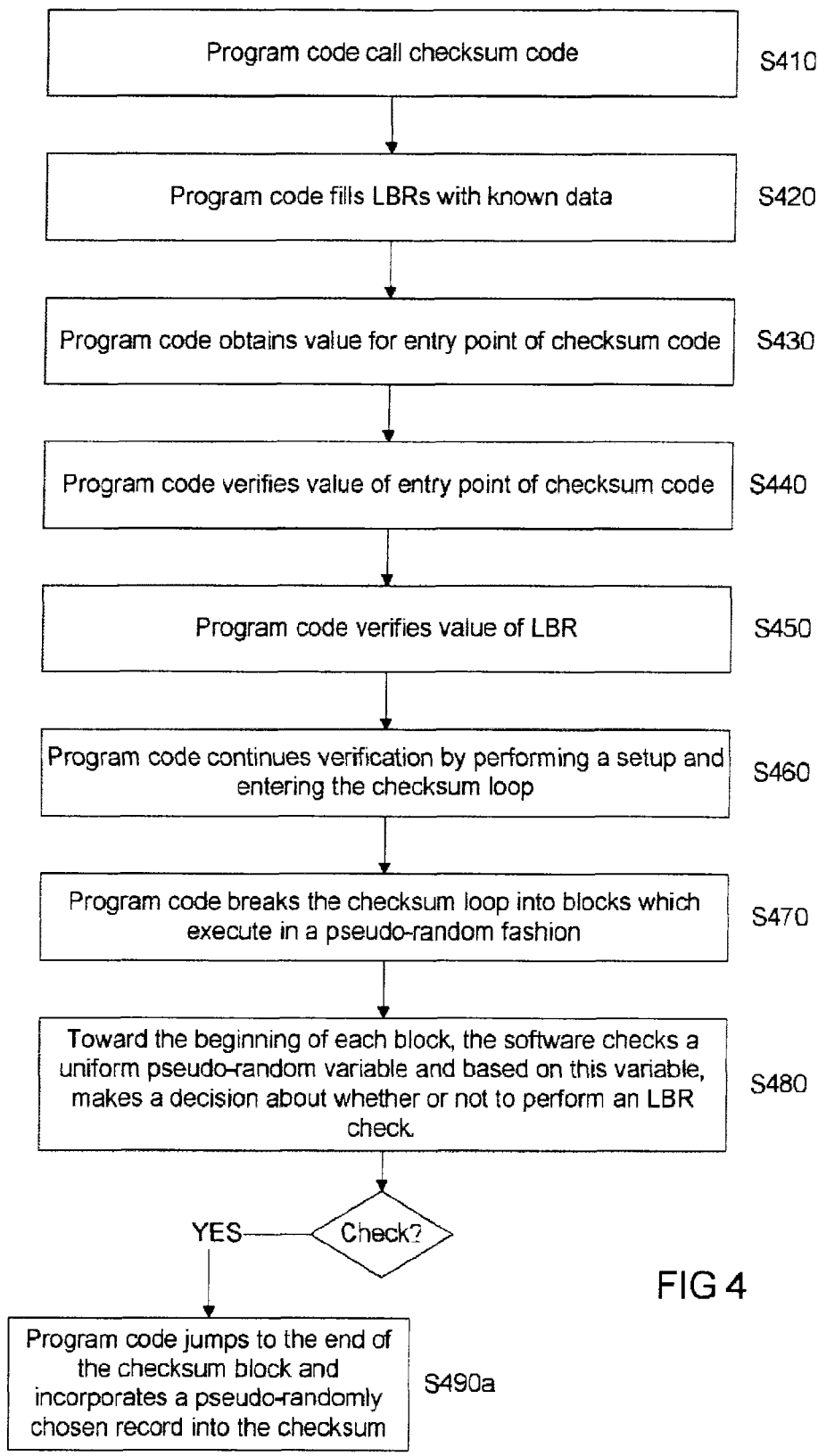
FIG. 4 is a workflow associated with an embodiment of the present invention.

FIG. 4 provides a workflow 400 of an embodiment of the present invention to illustrate an embodiment of the technique. The program code utilized in embodiments of the present invention can be called automatically or by a user and can be a result of a perceived security concern, or as a regular routine. For example, the program code to be called as a result of a hardware interrupt.

Program code executing on a processor calls checksum code (i.e., a small-size datum computed from an arbitrary block of digital data for the purpose of detecting errors which may have been introduced during its transmission or storage) (S410). When the checksum code is first called by the software, only the final jump is known. Upon entry into the checksum code, the software performs a fixed number of jumps to the next instruction to fill the LBRs with known data (S420). The number of jumps may be processor-specific in accordance with the number of LBRs. For example, processors in the Intel Xeon processor family have 16 LBRs, thus, when the processor executing the program code is one in this family, the software performs 15 jumps to ensure that all 16 LBR records have known data in them.

After populating the LBR values, the program code obtains the LBR To IP value for the entry point of the checksum code (S430). With the LBR table filled in, this LBR will be LBR[(TOS+1)% N. The program code then verifies that this LBR is the entry point of the checksum code (S440). The program code next verifies the LBR From IP for the same LBR (S450). Verifying the LBR From IP includes verifying that it is not a direct call, jump, or interrupt request to the executing code. In an embodiment of the present invention, the program code decodes the op-code at the address to determine if it is a call, jump or interrupt request, verifying that it is not to the executing code. A call, jump or interrupt is valid if the interrupted code just happened to be about to perform such an operation, however, it is not valid if it points to the executing code.

The software continues verification by performing a setup and entering the checksum loop (S460). The program code breaks the checksum loop into blocks which execute in a pseudo-random fashion (S470). Toward the beginning of each block, the software checks a uniform pseudo-random variable and based on this variable, makes a decision about whether or not to perform an LBR check (S480).

In an embodiment of the present technique, the software does not perform LBR checks on each iteration of the loop because reading MSRs on processors can sacrifice performance and risks the possibility that malware or another foreign agent executing in the environment could simulating the LBRs faster than the software can read and verify the real LBR values. Thus, by checking the LBRs periodically (and in a random fashion), the program code exploits the performance of the processor because the processor writes these records automatically in hardware and the program code only reads the LBRs periodically, for example, once every 64 iterations. Checking the LBRs periodically can positively impact the performance of the processor when compared to checking every iteration. For example, if the software checks the LBRs once every 64 iterations, the average cost of LBR check down to ~2.2 cycles per iteration (140/64) which is less than the 4 cycles per iteration required by an attacker to record each iteration jump to a memory location, even if that memory location is in the L1 cache. The example of 140 cycles in utilized in the non-limiting description of aspects of various embodiments because the time to read the LBRs utilizing an Intel processor is approximately 140 cycles Returning to FIG. 4, if the software determines that an LBR should be checked, the software jumps to the end of the checksum block and incorporates a pseudo-randomly chosen record into the checksum (S490a). By pseudo-randomly choosing when to incorporate an LBR and choosing the LBR to incorporate in a pseudo-random fashion, the present technique forces an attacker simulating the LBR stack to continuously record jumps on every iteration of the checksum loop, since the attacker cannot determine a priori which jumps need to be recorded without incurring significant overhead. Jumping to the end of the block also provides protection since any code modification in the block will result in an incorrect jump address for the check, which will be caught by the LBR check with some probability.

Below are some examples of how embodiments of the present technique can be utilized to mitigate different types of TOCTOU attacks. The first four attacks can be executed by executing the original checksum loop.

In the four attacks below, the attacker opts to execute the genuine checksum code, by intercepting the serial port interrupt, running code to hide evidence of tampering, manually populating LBRs with correct values and jumping directly into the checksum loop by skipping the initial instructions. As explained in further detail below, the program code executing on a processor, in an embodiment of the present invention, can detect these attacks, even in a multi-processor environment, including but not limited to a cloud-based environment, by randomly selecting an LBR register on randomly selected iterations of the checksum loop. The software can also select an LBR at the first iteration. In this case the last jump recorded by one of the LBRs will have an unexpected LBR_FROM_IP value. The value of this LBR will be included in the checksum with some probability. As explained later, while there is a low probability of the direct jump being detected in any given iteration of the loop, there is a high probability of it being detected over some number of attestations.

The attacks where the attacker opts to execute the genuine checksum are described as follows, with a brief description of how aspects of the present technique will identify the attack.

Attack 1—
The attacker intercepts the described interrupt and jumps, calls or performs a software interrupt into the original code. In an embodiment of the present invention, the check of the LBR From IP pointer will catch this attack.

Attack 2—
The attacker disables LBRs and jumps directly into checksum loop, however with LBRs disabled the LBRs will contain invalid data and the checksum will be computed incorrectly resulting in a verification failure Attack 3—
The attacker fills in the LBR table and jumps directly into checksum loop. However, because the last valid jump in the original code is from the entry jump table to the entry point verification, the processor will record an invalid jump into the LBR table as the attacker code jumps into the original code, this will be encoded into the checksum with some probability, over the course of many verifications the probability that one of these verifications will catch the attacker tends to 1

Attack 4—
The attacker disables LBRs, fills the LBR table and jumps directly into checksum loop. As a result of this attack, initial table will be correct, the checksum block jumps will not be recorded and checksum will be wrong resulting in a verification failure.

Certain attacks can entail the execution of a modified checksum loop, such as attacks 5 and 6, detailed below. For example, an attacker could execute a modified checksum loop that does not perform the initial LBR check and that simulates LBR value updates in the cache and uses the cached LBR values as part of the checksum. This attack approach enables the adversary to keep attack code in an incorrect memory location (memory copy) yet have valid values for LBRs. An embodiment of the present invention addresses this attack by using LBR values in a pseudo random manner based on the initial seed value from the verification machine. Thus, the attacker would have to monitor the LBRs and maintain the LBR values in the cache all the time. As long as the average time per iteration spent on accessing the LBR in is less than the time needed by the adversary simulating the LBR access, timing deviation would occur and a noticeable increase in verification time would expose the attacker. Various attacks that rely upon a modified checksum loop and the approach of an embodiment of the present invention to these attacks is described below.

Attack 5—
The attacker can simulate LBRs, however, because the attacker cannot determine which jumps will be encoded ahead of time, the attacker must record all jumps into the simulated LBR stack, this will result in a noticeable increase in verification time which will cause a verification failure.

Attack 6—
The attacker can use a table to translate LBRs, but while fairly efficient, when contrasted with Attack 5, the code results in an expansion of the checksum blocks, requiring extra work to be performed on each checksum iteration to account for this increase, which in turn causes a noticeable increase in verification time, which will cause a verification failure.

Below are explanations of the probabilities for utilizing the present invention in order to "catch" an attack. The numbers for the attacks below are the same as referenced above in the descriptions of the attacks. In the computation of probabilities for LBR checks, the following probabilities are used: 1) N—number of verification attempts; 2) n—number of iterations of the checksum loop per verification; and 3) L—average number of iterations per LBR Check.

As described above, Attack 1 is a static check. Thus, assuming correct implementation, the probability of catching the attack is 1.

In Attack 2, the disabled LBRs will not change, thus, if the attacker had not set the LBRs prior to entering the checksum loop, the LBRs will not have the correct addresses and the verification will fail as long as even a single LBR check is performed. If the attacker does set the LBRs to possibly valid value prior to jumping into the checksum loop there is some infinitesimally small probability that the LBR checked will have the correct value on every check. This probability is too small to be worth calculating. Therefore, the probability of catching the attack is nearly 1

Attack 3 is the most difficult to catch because the bad data exists in the LBR table for only a short time. In an embodiment of the present invention, the software checks a single LBR on average every L checksum iterations. Thus, the probability that an LBR check is performed on any given checksum iteration is: P(LBR check)=1/L. Given that an LBR check is performed, the probability that the LBR with the bad entry is selected is: P(bad LBR entry select|LBR check)=$1/16$. Thus, in this example, because there are 16 LBR records and each one is equally likely to be selected.

The flow of the code affects the LBR stack. If an LBR check is not performed, then the code simply falls through and performs a single jump at the end of the block. Alternatively, if an LBR check is performed, then the block contains three jumps: one to the LBR check code, one back to the block, and the jump at the end of the block. In the case that there are 16 LBR records, for example, and they shift up once for each jump, the software performs 16 jumps before the bad LBR entry leaves the LBR stack. Table 1 below indicates how many LBR check iterations and how many non-LBR check iterations the software performs while the bad entry still exists and can be caught by an LBR check (note the calculation here is 3*LBR+non-LBR=16 with the exception of the first case):

TABLE 1

| # LBR Checks | # Non-LBR Checks |
|---|---|
| 0 | 14 |
| 1 | 13 |
| 2 | 10 |
| 3 | 7 |
| 4 | 4 |
| 5 | 1 |

As seen to Table 1, the bad entry will shift out before the 6th check is performed. For each of the 6 mutually exclusive cases above, one can calculate the probability that this case happens. Notice that for the sake of the probability, how many times a check is performed and how many times a check is not performed is not considered. Thus, the cases can be viewed as Bernoulli trials with probability of success (p) being the probability that the software performs an LBR check and probability of failure (q) being the probability that the software does not perform a check. The following formula can be utilized: p(r successes in n trials)= $nCr*p^r*q^{(n-r)}$. The number of trials (n in this formula) is the sum of LBR checks and non-LBR checks for each case, which is not constant across the cases. Table 2 shows the calculations at each stage.

TABLE 2

| Case | P(Case) |
|---|---|
| 0 | 14 C 0 * $(1/L)^0$ * $(1 - 1/L)^{14}$ |
| 1 | 14 C 1 * $(1/L)^1$ * $(1 - 1/L)^{13}$ |
| 2 | 12 C 2 * $(1/L)^2$ * $(1 - 1/L)^{10}$ |
| 3 | 10 C 3 * $(1/L)^3$ * $(1 - 1/L)^7$ |
| 4 | 8 C 4 * $(1/L)^4$ * $(1 - 1/L)^4$ |
| 5 | 6 C 5 * $(1/L)^5$ * $(1 - 1/L)^1$ |

Each probability in Table 2 above is only the probability that that case occurs, not the probability that the attack is caught in that case. The probability that the attack is caught for each case can be computed easier as the complement of the probability that the attack is not caught in each case. The probability that the attack is not caught in a particular case is the probability that the attack is not caught on a particular LBR check raised the power of the number of LBR checks. (i.e. $(1-1/16)^r$) So the complements (and therefore the probability of catching the attack) are noted in Table 3 below.

TABLE 3

| Case | P(catch attack in this case | case) |
|---|---|
| 0 | $1 - (1 - 1/16)^0$ |
| 1 | $1 - (1 - 1/16)^1$ |
| 2 | $1 - (1 - 1/16)^2$ |
| 3 | $1 - (1 - 1/16)^3$ |
| 4 | $1 - (1 - 1/16)^4$ |
| 5 | $1 - (1 - 1/16)^5$ |

Now noting that P(A)=P(A|B)*P(B)/P(B|A) and P(B|A)= P(case|catch attack in this case)=1, the contribution to catching the attack in each case is P(catch attack in this case|case)*P(case) is noted in Table 4 below.

TABLE 4

| Case | P(catch attack due to this case) |
|---|---|
| 0 | (14 C 0 * $(1/L)^0$ * $(1 - 1/L)^{14}$) * $(1 - (1 - 1/16)^0)$ |
| 1 | (14 C 1 * $(1/L)^1$ * $(1 - 1/L)^{13}$) * $(1 - (1 - 1/16)^1)$ |
| 2 | (12 C 2 * $(1/L)^2$ * $(1 - 1/L)^{10}$) * $(1 - (1 - 1/16)^2)$ |
| 3 | (10 C 3 * $(1/L)^3$ * $(1 - 1/L)^7$) * $(1 - (1 - 1/16)^3)$ |
| 4 | (8 C 4 * $(1/L)^4$ * $(1 - 1/L)^4$) * $(1 - (1 - 1/16)^4)$ |
| 5 | (6 C 5 * $(1/L)^5$ * $(1 - 1/L)^1$) * $(1 - (1 - 1/16)^5)$ |

The total probability of catching an attack on a single attestation request is the sum of these mutually exclusive cases. To compute this of course, we select a value for L. Sixteen (16) was used an example, but 64 is more common and is utilized in Table 5 below, which shows a re-computation of the probabilities.

TABLE 5

| Case | P(catch attack) |
|---|---|
| 0 | 0 |
| 1 | 0.011140779 |
| 2 | 0.00166691 |
| 3 | 0.000072173 |
| 4 | 0.000000897 |
| 5 | 0.000000001 |
| total | 0.01288076 |

The probability of the software catching the attack after N verification attempts can also be computed. This probability is the same as the complement of the probability of not catching the attack in any of the N attempts, thus, P(catch within N attestation requests)=1−(1−P(catch))^N, as seen in Table 6 below.

TABLE 6

| N | P(catch) |
|---|---|
| 300 | 0.97954097 |
| 500 | 0.998469588 |
| 700 | 0.999885519 |
| 900 | 0.999991436 |

Thus, in the example above, an embodiment of the present technique has high reliability of catching the attack within 900 attestation requests. If maximum inter-attestation request time is set to 2 seconds, then the software can be configured to perform a check on average every 1.5 seconds and the attack will be caught with very high probability within 1350 seconds or 22.5 minutes.

In Attack 4, the attacker's approach starts with a correct first iteration, but the LBRs are not updated. Thus, the software perceives this attack as being equivalent to Attack 2 and thus, the probability of the software failing to detect this attack is negligible.

Attacks 5 and Attack 6 can both be caught by an embodiment of the present technique with a probability of 1 by setting the number of checksum loop iterations at a high value. The constant overhead per iteration of the attack grows with the number of iterations until it is large enough to differentiate from other sources of jitter.

Embodiments of the present invention are also effective is detecting attacks that are not explained above. For example, embodiments of the present invention can be utilized the thwart attacks that are specific to multi-processor systems. For example, an adversary could make use of multi-processor systems by running a legitimate checksum on one processor, while hiding evidence of tampering in parallel on a different processor. The software in the present invention includes initialization code that contains a CPU halt directive that disables processing on all processors other than the one invoking the directive. The execution of this code by a processor will prevent parallel processing being done by the attacker. Although, the attacker could conceivably bypass the CPU halt directive and jump straight into the checksum code, but the protections listed in the previous section to guard against TOCTOU attacks, would be able to detect this attempt to bypass the CPU halt directive.

Once a CPU is halted it can only be resumed by use of a non-maskable interrupt (NMI). The software in an embodiment of the present invention replaces the NMI handler with a custom handler that instructs the CPU to remain halted if it is triggered before the attestation request has completed. In the event that this is an attack, the CPU core processing the attestation request would also halt causing the system to lock entirely and the attack to be detected by the verifier machine. In another embodiment of the present invention where this behavior is not desirable, the software includes adding a check to the NMI handler to ignore the request if executed on the boot strap processor.

Embodiments of the present invention protect against a variety of attacks. Embodiments of the present invention may include a strongly-ordered checksum to prevent parallelization or reordering optimizations, a keyed checksum to prevent replay attacks, and masking/replacement of interrupt handlers to support un-tampered execution. In an embodiment of the present invention, data substitution attacks are handled using pseudo-random traversal of the program code, causing adversarial overhead.

Figure 5:
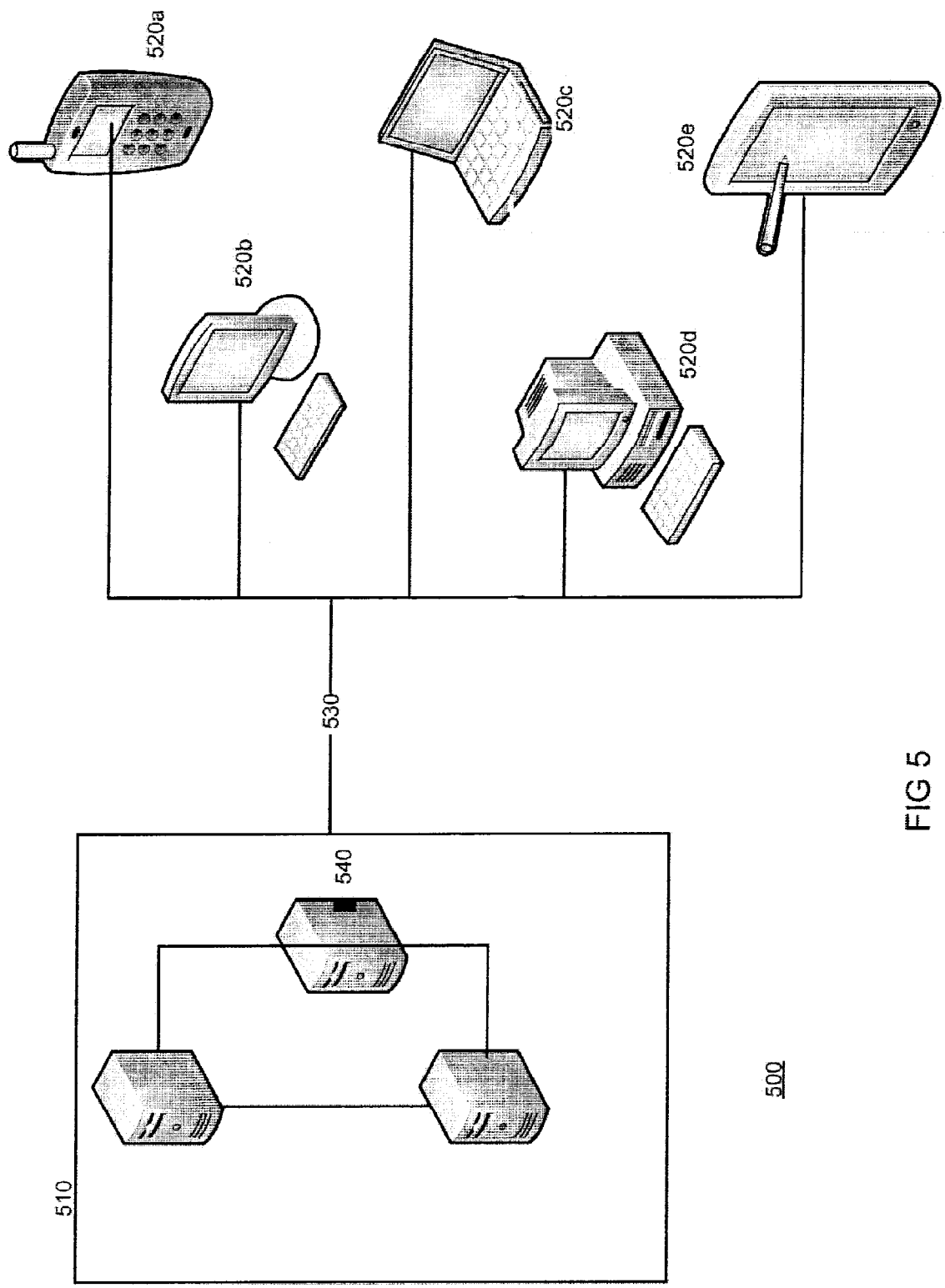
FIG. 5 depicts one example of an aspect a computing environment used to execute one or more aspects of an embodiment of the present invention.

FIG. 5 is a computing environment 500 used to execute one or more aspects of an embodiment of the present invention. In this embodiment, a computer system 510, which can include a cloud and/or an enterprise system, is accessible by one or more terminals 520a-520e. Computer system 510 can also be a single computer resource. The terminals access the one or more resources of the computer system 510 via a network connection 530, including but not limited to a LAN, a WLAN, and/or an Internet connection.

In this embodiment, computer system 510 contains one or more servers, such as web or application servers, that serve content to the terminals 520a-520e over the network connection 530.

In this embodiment, each of the terminals 520a-520e includes at least one processor (not pictured) and at least one memory resource (not pictured). The terminals 520a-520e are capable of executing a client program on the terminals 520a-520e, including but not limited to a thin client, proprietary client, or a web browser, which users of the terminals 520a-50e utilize to interact with a client application 540 executed on one or more resources of the computer system 510. In this embodiment, the client application 540, which is comprised of computer readable program code, is depicted as residing on one of the resources of the computer system 510. The terms "computer readable program code" and software are used interchangeably and both refer to logic executed by processing circuits on computer resources.

In further embodiments of the present invention, the client application 540 is installed on one or more resources of the computer system 510 and/or one or more computer resources accessible to one or more resources of the computer system 510. In a further embodiments of the present invention, the client application 540 is web-enabled with a back end server, as opposed to being an installed client.

An embodiment of the present invention also includes a computer program product executed by a processor on one or more computers.

Figure 6:
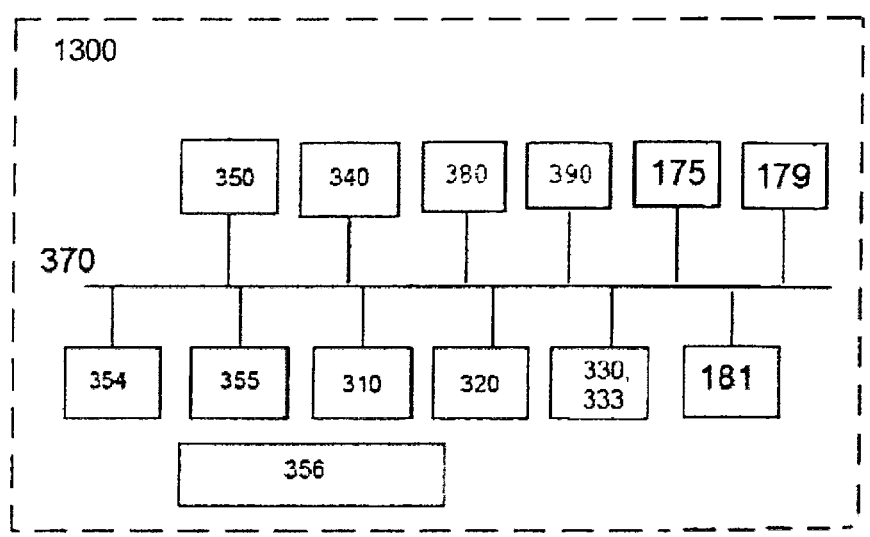
FIG. 6 depicts one embodiment of a single processor computing environment to incorporate and use one or more aspects of the present invention.

FIG. 6 illustrates a block diagram of a resource 1300 in computer system 110 and/or terminal 120a-120b, which is part of the technical architecture of certain embodiments of the technique. The resource 1300 may include a circuitry 370 that may in certain embodiments include a microprocessor 354. The computer system 1300 may also include a memory 355 (e.g., a volatile memory device), and storage 181. The storage 181 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 355 may comprise an internal storage device, an attached storage device and/or a network accessible storage device. The system 1300 may include a program logic 330 including code 333 that may be loaded into the memory 355 and executed by the microprocessor 356 or circuitry 370.

In certain embodiments, the program logic 330 including code 333 may be stored in the storage 181, or memory 355. In certain other embodiments, the program logic 333 may be implemented in the circuitry 370. Therefore, while FIG. 2 shows the program logic 333 separately from the other elements, the program logic 333 may be implemented in the memory 355 and/or the circuitry 370.

Using the processing resources of a resource 1300 to execute software, computer-readable code or instructions, does not limit where this code is can be stored.

Figure 7:
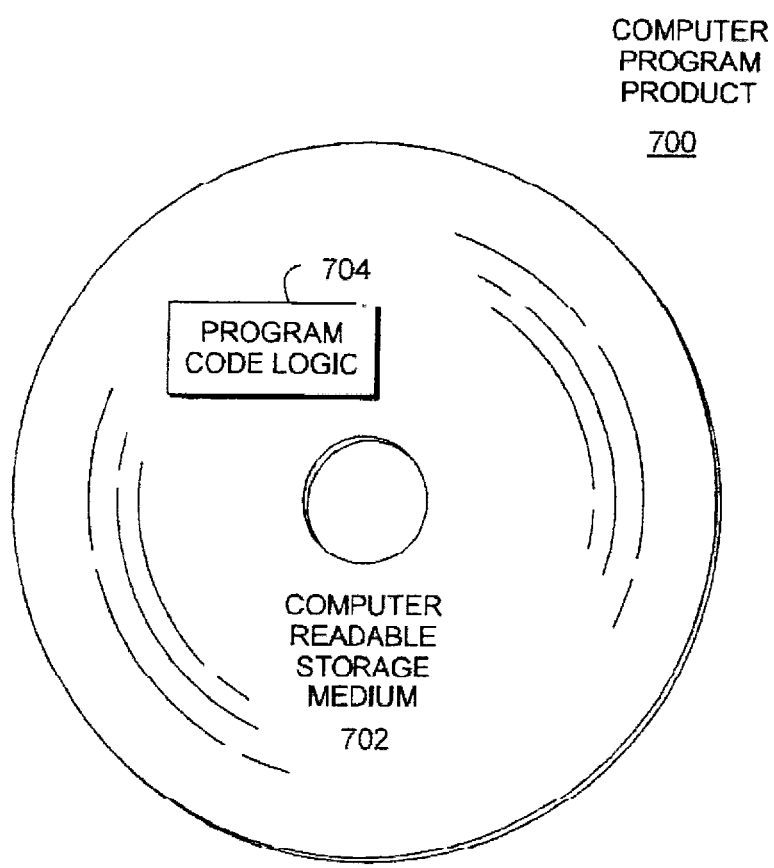
FIG. 7 depicts one embodiment of a computer program product incorporating one or more aspects of the present invention.

Referring to FIG. 7, in one example, a computer program product 700 includes, for instance, one or more non-transitory computer readable storage media 702 to store computer readable program code means or logic 704 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions, also referred to as computer program code, may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique. As a further aspect of the technique, the system can operate in a peer to peer mode where certain system resources, including but not limited to, one or more databases, is/are shared, but the program code executable by one or more processors is loaded locally on each computer (workstation).

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. Examples of software components include network application server software; and database software, Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for mitigating TOCTOU attacks comprising:
performing, by a processor of a trusted host communicatively coupled to an untrusted host via a communications connection, a run-time integrity verification of a first process executed by the processor of the untrusted host to determine that a first process executed on the untrusted host was launched from a pre-defined location and executed from beginning to end, wherein the untrusted host comprises multiple processors, the performing comprising:
   requesting, by the processor of the trusted host, from a first processor of the multiple processors of the untrusted host, measurements representing operation of a first process on an untrusted host;
   based on the requesting, obtaining, by the processor of the trusted host, the measurements, wherein the measurements comprise a checksum that is a result of a second process executing checksum code on the untrusted host to verify, during run-time of the first process, at least one pseudo-randomly chosen last branch record on the untrusted host; and
   determining, by the processor, based on the measurements, whether the first process was compromised by utilizing the pseudo-randomly chosen last branch record to verify that the first process was launched from a pre-defined location and executed from beginning to end by the untrusted host.

2. The method of claim 1, further comprising:
determining, by the processor, at least one of: whether the requesting was intercepted before the measurements were conducted, or whether the second process was compromised.

3. The method of claim 1, further comprising:
halting, by the processor of the trusted environment, execution of instructions by a portion of the multiple processors, wherein the portion does not include the first processor; and
based on determining that the first process was not compromised, resuming, by the processor of the trusted environment, the halted processors.

4. The method of claim 3, further comprising
instructing, by the processor of the trusted environment, the halted processors to remain halted when instructed by another host to re-start during the determining whether the first process was compromised.

5. The method of claim 1, wherein the requesting comprises sending a random number to the second process and wherein the checksum is a self checksum of the random number and the measurements further comprise a secure hash algorithm hash of a hypervisor running on the untrusted host, wherein the self checksum and the secure hash algorithm hash were computed by the second process.

6. The method of claim 1, wherein the at least one last branch record comprises an LBR From IP pointer.

7. The method of claim 1, the determining further comprises determining that the checksum is invalid, and based on the invalid checksum, determining that the first process was compromised.

8. The method of claim 7, wherein executing checksum code to verify at least one last branch record comprises obtaining an invalid jump in a last branch record table on the untrusted host.

9. The method of claim 7, wherein executing checksum code to verify at least one last branch record comprises obtaining a last branch record without a respective block jump.

10. The method of claim 7, wherein the checksum is invalid based on an increase in verification time.

11. The method of claim 1, further comprising:
halting, by the processor, an activity on a second host until completing the determining.

12. A computer system for mitigating TOCTOU attacks, the computer system comprising:
a memory; and
a processor in communication with the memory, wherein the computer system is configured to perform a method, the method comprising:
   performing, by a processor of a trusted host communicatively coupled to an untrusted host via a communications connection, a run-time integrity verification of a first process executed by the processor of the untrusted host to determine that a first process executed on the untrusted host was launched from a pre-defined location and executed from beginning to end, wherein the untrusted host comprises multiple processors, the performing comprising:
      requesting, by the processor of the trusted host, from a first processor of the multiple processors of the untrusted host, measurements representing operation of a first process on an untrusted host;
      based on the requesting, obtaining, by the processor of the trusted host, the measurements, wherein the measurements comprise a checksum that is a result of a second process executing checksum code on the untrusted host to verify, during run-time of the first process, at least one pseudo-randomly chosen last branch record on the untrusted host; and
      determining, by the processor, based on the measurements, whether the first process was compromised by utilizing the pseudo-randomly chosen last branch record to verify that the first process was launched from a pre-defined location and executed from beginning to end by the untrusted host.

13. The computer system of claim 12, further comprising:
determining, by the processor, at least one of: whether the requesting was intercepted before the measurements were conducted, or whether the second process was compromised.

14. The computer system of claim 12, further comprising:
halting, by the processor of the trusted environment, execution of instructions by a portion of the multiple processors, wherein the portion does not include the first processor; and based on determining that the first process was not compromised, resuming, by the processor of the trusted environment, the halted processors.

15. The computer system of claim 14, further comprising instructing, by the processor of the trusted environment, the halted processors to remain halted when instructed by another host to re-start during the determining whether the first process was compromised.

16. The computer system of claim 12, wherein the requesting comprises sending a random number to the second process and wherein the checksum is a self checksum of the random number and the measurements further comprise a secure hash algorithm hash of a hypervisor running on the host, wherein the self checksum and the secure hash algorithm hash were computed by the second process.

17. The computer system of claim 12, wherein the at least one last branch record comprises an LBR From IP pointer.

18. The computer system of claim 12, the determining further comprises determining that the checksum is invalid, and based on the invalid checksum, determining that the first process was compromised.

19. The computer system of claim 12, wherein executing checksum code to verify at least one last verify at least one last branch record comprises at least one of: obtaining an invalid jump in a last brand record table on the host, obtaining a last branch record without a block jump, or recording an increase in verification time.

20. A non-transitory computer readable storage medium readable by one or more processors and storing instructions for execution by the one or more processors for performing a method of mitigating TOCTOU attacks comprising:

performing, by a processor of a trusted host communicatively coupled to an untrusted host via a communications connection, a run-time integrity verification of a first process executed by the processor of the untrusted host to determine that a first process executed on the untrusted host was launched from a pre-defined location and executed from beginning to end, wherein the untrusted host comprises multiple processors, the performing comprising:

requesting, by the processor of the trusted host, from a first processor of the multiple processors of the untrusted host, measurements representing operation of a first process on an untrusted host;

based on the requesting, obtaining, by the processor of the trusted host, the measurements, wherein the measurements comprise a checksum that is a result of a second process executing checksum code on the untrusted host to verify, during run-time of the first process, at least one pseudo-randomly chosen last branch record on the untrusted host: and determining, by the processor, based on the measurements, whether the first process was compromised by utilizing the pseudo-randomly chosen last branch record to verify that the first process was launched from a pre-defined location and executed from beginning to end by the untrusted host.

* * * * *